UNITED STATES PATENT OFFICE.

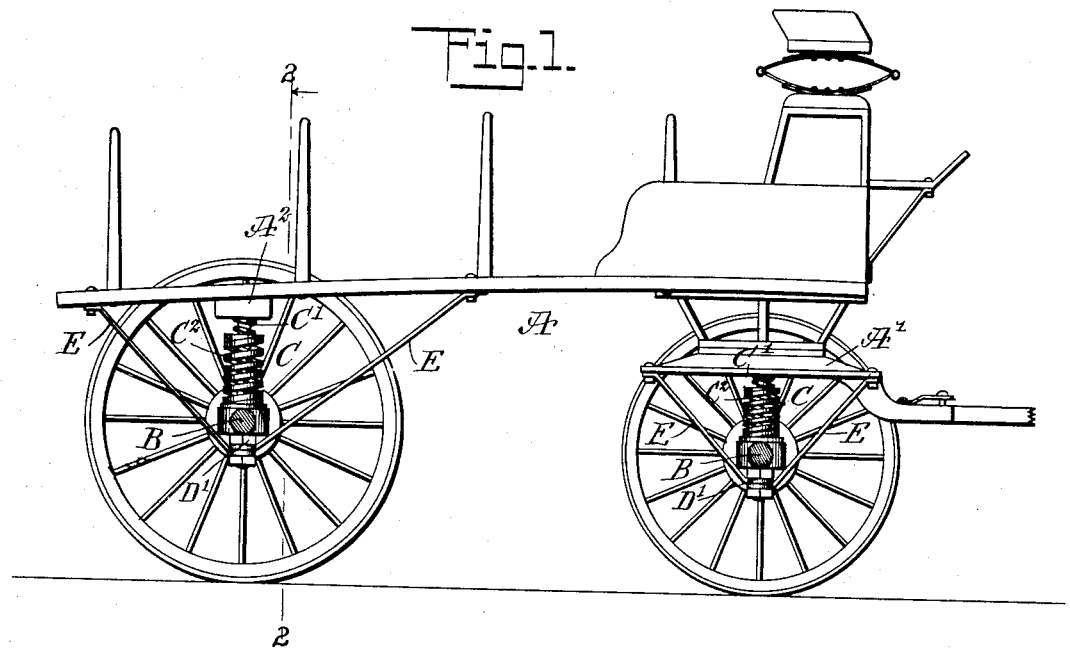
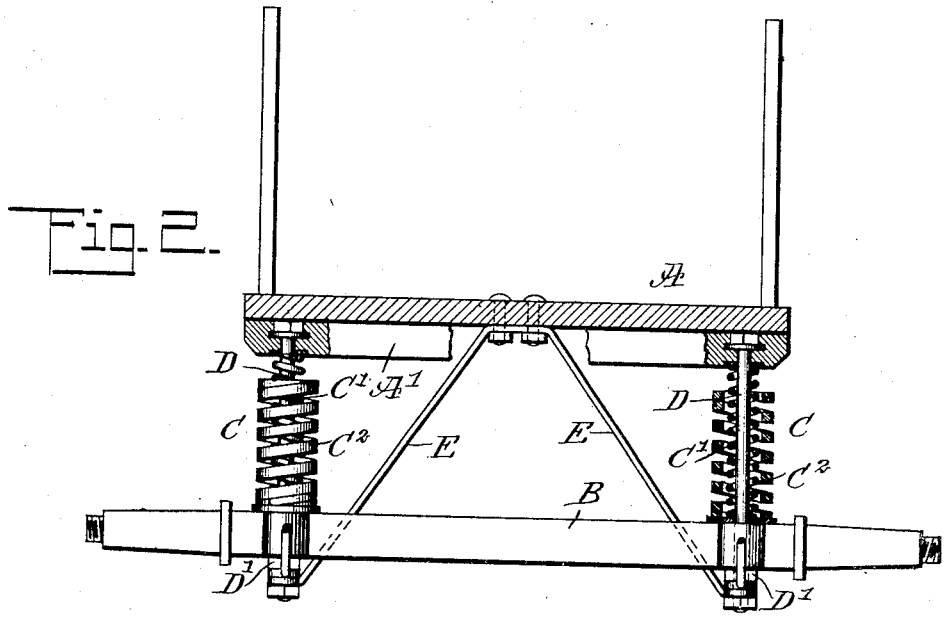
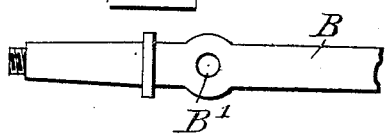

JAMES N. BREWSTER, OF NEW YORK, N. Y.

VEHICLE-SPRING.

931,990.     Specification of Letters Patent.     Patented Aug. 24, 1909.

Application filed May 25, 1908. Serial No. 434,771.

*To all whom it may concern:*

Be it known that I, JAMES N. BREWSTER, a citizen of the United States, and a resident of the city of New York, borough of Brooklyn, in the county of Kings and State of New York, have invented a new and Improved Vehicle-Spring, of which the following is a full, clear, and exact description.

The invention relates to carriages, road wagons, trucks and like vehicles, and its object is to provide a new and improved vehicle spring, arranged to yieldingly support the vehicle body and to readily compensate for the variation of the load, without danger of breaking or injuring the springs and without requiring the heavy multiple leaf springs now generally employed.

The invention consists of novel features and parts and combinations of the same, which will be more fully described hereinafter and then pointed out in the claim.

A practical embodiment of the invention is represented in the accompanying drawings forming a part of this specification, in which similar characters of reference indicate corresponding parts in all the views.

Figure 1 is a sectional side elevation of the improvement as applied to a truck; Fig. 2 is an enlarged transverse section of the same on the line 2—2 of Fig. 1, the wheels being removed from the rear axle; and Fig. 3 is a plan view of part of one of the axles.

Between the vehicle body A of any approved construction and the front and rear axles B of the vehicle are interposed the springs C, each composed of an inner light coil spring C', and an outer heavy coil spring $C^2$ inclosing the inner coil spring C', coiled around a rod D depending from the vehicle body A and extending loosely through an aperture or a guideway B' formed in the corresponding front or rear axle B. As shown in Fig. 2, two sets of springs C are preferably employed for each axle B. Each of the inner springs C' is somewhat longer than its corresponding outer spring $C^2$, whereby the inner and lighter springs C' yieldingly support the vehicle body A until it and its load has pressed the springs C' to reach the other and outer heavy springs $C^2$, to sustain an increase in the load. Thus each of the springs C is properly graduated to insure an exceedingly easy riding of the vehicle body A.

As shown in Fig. 1, the rods D for the front axle B depend from the bolster A', connected by the fifth wheel, in the usual manner, with the vehicle body A, while the rods D for the rear axle B are attached and depend from a cross bar $A^2$ secured to the under side of the vehicle body A. The lower ends of the rods D are provided with nuts or collars D', to limit the upward movement of the rods D in the guideways B', and the lower ends of the rods D are also connected by braces E with the vehicle body A, so as to hold the rods D in the proper position without danger of the rods binding in the guideways B'. The braces E are secured to the rods D below the axles and extend forwardly and rearwardly, the front braces being secured to the bolster A' and the rear braces to the body A.

From the foregoing, it will be seen that by the arrangement described the vehicle can be cheaply constructed, as the use of expensive and heavy leaf springs is entirely dispensed with, and by having the vehicle body A connected by the rods D with the axles, and with the springs C interposed between the vehicle body and the axles, it is evident that a strong construction is obtained without increasing the weight of the vehicle, but on the contrary making it lighter than the ordinary vehicles having leaf springs.

Having thus described my invention, I claim as new and desire to secure by Letters Patent:

In a vehicle the combination with a body having a bolster, and front and rear axles having vertical openings adjacent to their spindles, of a pair of rods depending from the body and bolster respectively and projecting loosely through the openings of the axles, the rods being provided at their lower ends below the axles with collars to limit their upward movement, two coiled springs of unequal resiliency upon each rod, one within the other and resting upon the axles, the inner one being the more resilient and projecting normally above the outer one, and braces secured to the lower ends of the rods below the axles and extending forwardly and rearwardly, the front braces being secured to the bolster and the rear braces to the body.

In testimony whereof I have signed my name to this specification in the presence of two subscribing witnesses.

JAMES N. BREWSTER.

Witnesses:
   THEO. G. HOSTER,
   EVERARD B. MARSHALL.